US011221593B2

(12) United States Patent
Chen

(10) Patent No.: US 11,221,593 B2
(45) Date of Patent: Jan. 11, 2022

(54) CORRECTION CONTROL METHOD OF HIDDEN SWITCH WITH FUZZY INFERENCE SYSTEM

(71) Applicant: Compal Electronics, Inc., Taipei (TW)

(72) Inventor: Huang-Chih Chen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 299 days.

(21) Appl. No.: 16/535,953

(22) Filed: Aug. 8, 2019

(65) Prior Publication Data

US 2020/0356064 A1 Nov. 12, 2020

(30) Foreign Application Priority Data

May 7, 2019 (TW) .................................. 108115786

(51) Int. Cl.
G05B 13/02 (2006.01)

(52) U.S. Cl.
CPC ................................ G05B 13/0275 (2013.01)

(58) Field of Classification Search
None
See application file for complete search history.

(56) References Cited

U.S. PATENT DOCUMENTS

| | | | | | |
|---|---|---|---|---|---|
| 5,305,425 A | * | 4/1994 | Ishida | ..................... | G06N 7/026 706/60 |
| 5,587,898 A | * | 12/1996 | Palm | ........................ | G06N 7/04 700/50 |
| 5,708,761 A | * | 1/1998 | Nitta | ....................... | G06N 5/048 706/60 |
| 6,073,262 A | * | 6/2000 | Larkin | ...................... | G05B 9/03 714/736 |
| 6,853,991 B1 | * | 2/2005 | Kermani | .................. | G06N 7/06 706/52 |

(Continued)

FOREIGN PATENT DOCUMENTS

| | | | | |
|---|---|---|---|---|
| EP | 0555482 A1 | * | 8/1993 | ............... G06N 7/04 |
| TW | 201429098 A | | 7/2014 | |

(Continued)

*Primary Examiner* — Bernard G Lindsay
(74) *Attorney, Agent, or Firm* — Kirton McConkie; Evan R. Witt

(57) ABSTRACT

A correction control method includes steps of rebuilding a fuzzy inference system, setting a maximum correction value and a minimum correction value, determining whether there is an output value to be outputted, deciding a intermediate correction value and determining whether a range of an interval between the maximum correction value and the intermediate correction value is enough to constitute the fuzzy interval of the membership function, allowing the correction unit to output the maximum correction value, the minimum correction value and the intermediate correction value, adjusting the fuzzy inference system, allowing the fuzzification unit to constitute the minimum correction value according to the output value, determining whether a range of an interval between the maximum correction value and the minimum correction value is enough to constitute the fuzzy interval, and notifying that functions of the fuzzy inference system are failed. The functionality of supervised algorithm of hidden switch is enhanced.

10 Claims, 7 Drawing Sheets

(56) References Cited

U.S. PATENT DOCUMENTS

| | | | | |
|---|---|---|---|---|
| 8,892,496 B2* | 11/2014 | Yao | ............... | G06N 7/02 |
| | | | | 706/52 |
| 2002/0147530 A1 | 10/2002 | Tamagawa et al. | | |
| 2007/0240437 A1 | 10/2007 | Yonezawa et al. | | |
| 2007/0250214 A1* | 10/2007 | Lee | ............ | G05B 13/0275 |
| | | | | 700/266 |
| 2010/0138364 A1* | 6/2010 | Cruz | ............ | G06N 5/048 |
| | | | | 706/2 |
| 2017/0278008 A1* | 9/2017 | Clark | ............ | G06N 7/023 |

FOREIGN PATENT DOCUMENTS

| | | |
|---|---|---|
| TW | 201712280 A | 4/2017 |
| TW | 201743148 A | 12/2017 |
| TW | 201839578 A | 11/2018 |
| WO | 2009082042 A1 | 7/2009 |

\* cited by examiner

CORRECTION CONTROL METHOD OF HIDDEN SWITCH WITH FUZZY INFERENCE SYSTEM

CROSS-REFERENCE TO RELATED APPLICATION

This application claims priority from Taiwan Patent Application No. 108115786, filed on May 7, 2019, the entire contents of which are incorporated herein by reference for all purposes.

FIELD OF THE INVENTION

The present invention relates to a correction control method, and more particularly to a correction control method of a hidden switch.

BACKGROUND OF THE INVENTION

In recent years, in electronic devices, such as mobile phones or electronic wristbands, it is very common to use hidden switches for corresponding functional operations, such as turning on/off the power supply. The hidden switch can be mainly divided into a capacitance-sensing architecture and a pressure-sensing architecture, in which the hidden switch of the capacitance-sensing architecture has drawbacks of being unable to operate with metal or wet fingers. As for the hidden switch of the pressure-sensing architecture, since the sensor is used to sense the magnitude of the pressure received by the hidden switch or the magnitude of the deformation when the hidden switch is pressed, thereby achieving the function of the switch control. The problems with the hidden switches of the capacitance-sensing architecture can be avoided.

At present, the hidden switch of the pressure-sensing architecture can be operated by using a supervised algorithm, such as a membership function of a fuzzy control, to determine whether the pressing of the hidden switch is artificially operated or improperly touched. However, once the input condition of the hidden switch changes, for example, after a long time of use, the fuzzy interval between the input maximum value and the input minimum value reflected during being pressed is reduced and cannot be as specified as the defined initial value at the factory. At this time, the fuzzy interval of the membership function still uses the range of the initially defined fuzzy interval, which will result in poor functionality or even failure of the hidden switch.

Therefore, there is a need of providing an improved correction control method of a hidden switch distinct from the prior art in order to solve the above drawbacks.

SUMMARY OF THE INVENTION

The present invention provides a correction control method of a hidden switch, so that when the supervised algorithm is used by a traditional hidden switch to supervise and control, the problems of being unable to be correspondingly adjusted with variation of the input condition of the hidden switch, and the poor functionality of control and the failure of hidden switch can be solved.

In accordance with an aspect of the present invention, there is provided a correction control method of a hidden switch. The correction control method is applied to a controller of an electronic device to perform a correction control on each pressing operation of a hidden switch. The correction control method includes steps of (a) rebuilding a fuzzy inference system, wherein the fuzzy inference system comprises a fuzzification unit, a rule base, a fuzzy inference unit, a defuzzification unit and a correction unit, the rule base defines forms and ranges of a plurality of fuzzy rules and at least a membership function, the fuzzification unit correspondingly receives an input value when the pressing operation is performed through the hidden switch and converts into a fuzzy input set corresponding to the membership function, the fuzzy inference unit receives the fuzzy input set to execute inferences of the fuzzy rules so as to output a fuzzy output set, and the defuzzification unit performs a defuzzification on the fuzzy output set to determine a fuzzy interval where a dynamic range is located as every time the hidden switch is pressed and correspondingly generate an output value, (b) setting a maximum correction value and a minimum correction value, (c) determining whether there is an output value to be outputted, (d) deciding a intermediate correction value by an average value of the maximum correction value and the minimum correction value, and determining whether a range of an interval between the maximum correction value and the intermediate correction value is enough to constitute the fuzzy interval of the membership function, (e) allowing the correction unit to output the maximum correction value, the minimum correction value and the intermediate correction value, (f) adjusting the fuzzy inference system, so that the range and the number of the fuzzy interval of the membership function are dynamically adjusted, (g) allowing the fuzzification unit to constitute the minimum correction value according to all the output value which are presently received, (h) determining whether a range of an interval between the maximum correction value and the minimum correction value is enough to constitute the fuzzy interval of the membership function, and (i) notifying that functions of the fuzzy inference system are failed. The step (a), the step (b) and the step (c) are sequentially performed. When the judgment result of the step (c) is TRUE, the step (d) is performed. When the judgment result of the step (c) is FALSE, the step (g) is performed. When the judgment result of the step (d) is TRUE, the step (e) and the step (f) are sequentially performed. When the judgment result of the step (d) is FALSE, the step (i) is performed. The step (h) is performed after the step (g). When the judgment result of the step (h) is TRUE, the step (d) is performed. When the judgment result of the step (h) is FALSE, the step (i) is performed.

The above contents of the present invention will become more readily apparent to those ordinarily skilled in the art after reviewing the following detailed description and accompanying drawings, in which:

BRIEF DESCRIPTION OF THE DRAWINGS

FIG. 2 schematically illustrates the configuration of an electronic device having a hidden switch which the correction control method shown in FIG. 1 is applied to;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
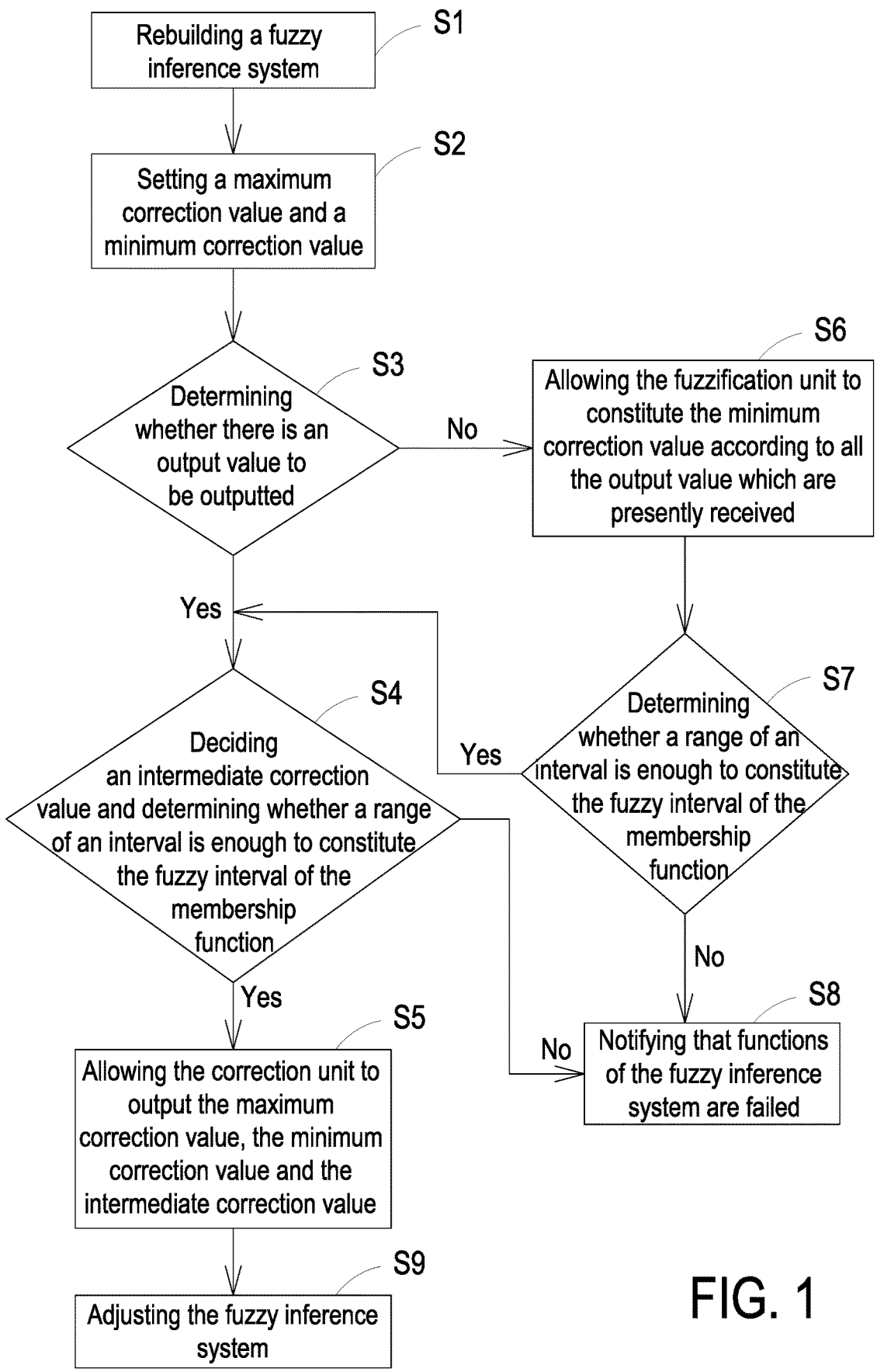
FIG. 1 schematically illustrates the flow chart of a correction control method of a hidden switch according to an embodiment of the present invention.
Figure 2:
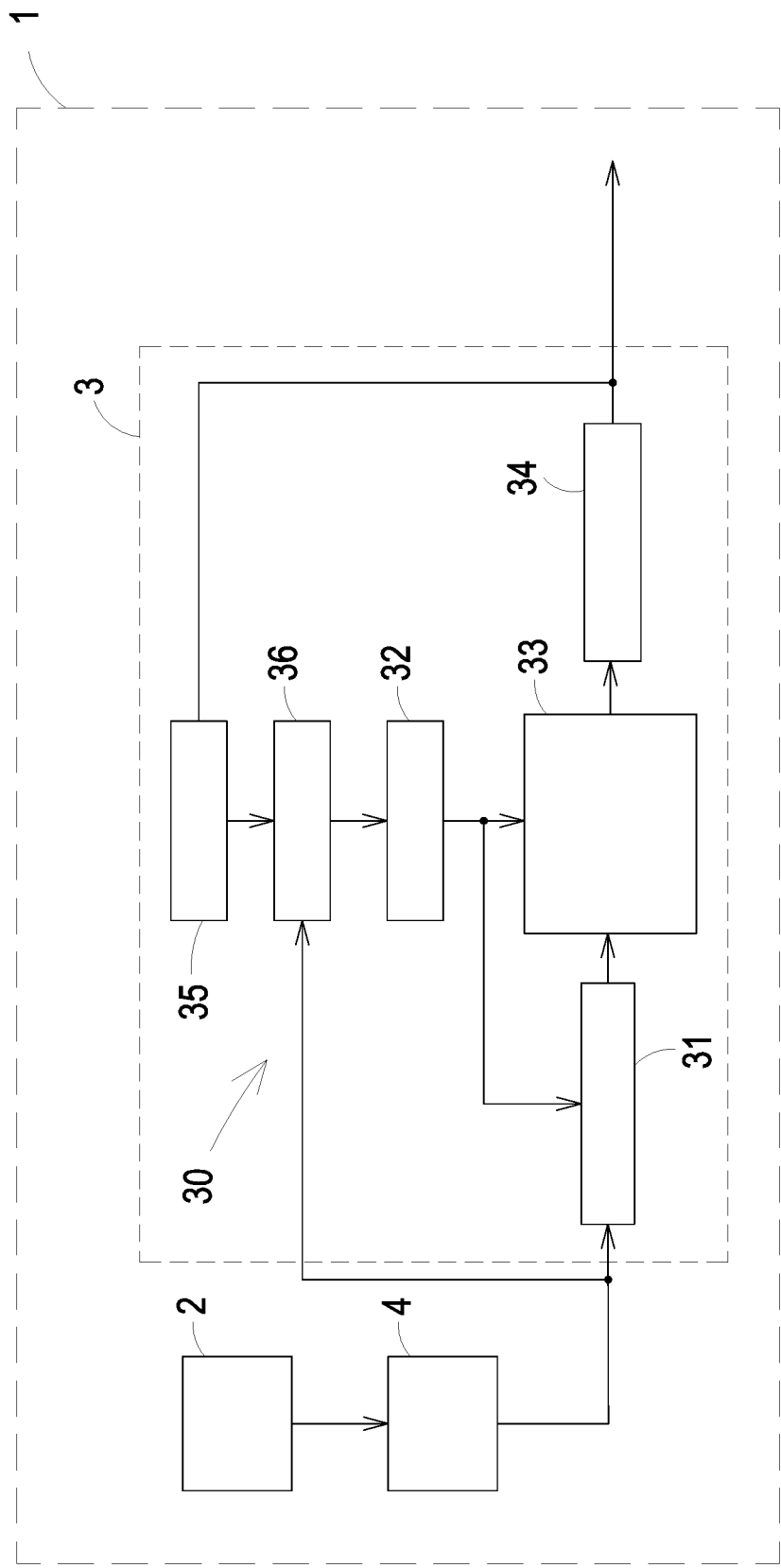

Please refer to FIG. 1 and FIG. 2. FIG. 1 schematically illustrates the flow chart of a correction control method of a hidden switch according to an embodiment of the present invention. FIG. 2 schematically illustrates the configuration of an electronic device having a hidden switch which the correction control method shown in FIG. 1 is applied to. As shown in FIG. 1 and FIG. 2, a correction control method of the present invention can correspondingly correct the control of a hidden switch 2 of an electronic device 1 in response to the changing of input conditions, such as aging situations, of the hidden switch 2. The electronic device 1 can be a mobile phone, an electronic wristband or a digital camera, but not limited herein. Any electronic device having a requirement of a hidden switch is applied to the correction control method of the present invention. In addition, the electronic device 1 includes not only at least a hidden switch 2, but also a controller 3 and a sensor 4. When the hidden switch 2 is pressed, the sensor 4 can sense the magnitude of a received pressure or a deformation caused by pressing of the hidden switch 2. The controller 3 uses an input value outputted by the sensor 4 during each pressing operation of the hidden switch 2 as an output value for controlling the hidden switch. In addition, the input conditions (e.g. aging situations) of the hidden switch 2 of the electronic device 1 practically affect the input value outputted by the sensor 4, and the output value of the controller 3 adjusts correspondingly in response to the change of the input value, so the output value of the controller 3 can practically reflect the using conditions of the hidden switch 2 of the electronic device 1. As a result, in the present embodiment, when the an output value is outputted by the controller 3 to control the hidden switch 2, the controller 3 further adjusts the control strategy corresponding to the hidden switch 2 according to the output value, such that the control is corrected for controlling the hidden switch in the next time according to the previous one output value.

In some embodiments, the input value received by the controller 3 from an analog-digital converter (ADC) 4 is the converted digital signal. Additionally, the controller 3 and the analog-digital converter 4 can be separately disposed and be independent from each other, but not limited herein. In some embodiments, the analog-digital converter 4 can be combined or integrated with the controller 3 for saving hardware space. On the other hand, the hidden switch 2 can be but not limited to a power button or a shutter button, and the number of the hidden switch 2 can be plural. For example, two hidden switches respectively constitute a volume up button and a volume down button.

In some embodiments, controller 3 utilizes a membership function of fuzzy control to supervise the operation of the hidden switch 2, so the controller 3 may rebuild a fuzzy inference system 30 during each operation of the hidden switch 2 and fuzzy control the hidden switch 2 through the fuzzy inference system 30, so that the advantages of enhancing the accuracy of the control range are achieved. Meanwhile, an automatic correction of the hidden switch 2 can be implemented when the input conditions of the hidden switch 2 are changed. Furthermore, when the input condition of the hidden switch 2 gets worse and further causes the control correction no longer being performed, the fuzzy inference system 30 can notify the user that the function of the fuzzy inference system 30 is invalid.

The fuzzy inference system 30 includes a fuzzification unit 31, a rule base 32, a fuzzy inference unit 33, a defuzzification unit 34 and a correction unit 35. The rule base 32 defines a plurality of fuzzy rules and form and range of at least a membership function. The fuzzification unit 31 correspondingly receives an input value from an analog-digital converter 4 when the pressing operation is performed through the hidden switch 2 and converts the input value into a fuzzy input set corresponding to the membership function in the rule base 32. The fuzzy inference unit 33 receives the fuzzy input set to execute inferences of the fuzzy rules so as to output a fuzzy output set. The defuzzification unit 34 performs a defuzzification on the fuzzy output set to determine a fuzzy interval where a dynamic range is located as every time the hidden switch 2 is pressed and correspondingly generate an output value, such that the hidden switch 2 is correspondingly controlled according to the output value. A maximum correction value and a minimum correction value can be stored in the correction unit 35. The initial values of the maximum correction value and the minimum correction value can be preset. The input value of the correction unit 35 is the output value of the present output of the defuzzification unit 34. In addition, the input value presently received by the correction unit 35 (i.e. the output value generated by the defuzzification unit 34 through the defuzzification in progress) is compared with the previous one result of the pressing operation of the hidden switch 2, and when the input value presently received is out of a set interval of the present maximum correction value in the specific proportional relationship, the output value presently being in progress of defuzzification of the defuzzification unit 34 is set as the maximum correction value. Moreover, several values under a non-inputted state (i.e. the background signal values generated by the hidden switch 2 when the hidden switch 2 is non-inputted) sampled by the fuzzification unit 31 before the previous operation of the hidden switch 2 are averaged as the minimum correction value by the correction unit 35.

In the previous embodiments, the controller 3 may firstly establish a system initial maximum value and a system initial minimum value converted from an analog signal into a digital signal according to the initial values of operation factory parameters of the electronic device 1 so as to initially establish the form and the range of the membership function by utilizing the system initial maximum value and the system initial minimum value. Under this circumstance, the controller 3 firstly defines a fuzzy inference theory and the judgment method thereof and further performs the inferences of a plurality of fuzzy rules.

Please refer to FIG. 1 again. Step S1, of rebuilding a fuzzy inference system 30, of the correction control method of the present invention is firstly performed. Next, step S2 of setting a maximum correction value and a minimum correction value is performed. In the step S2, the input value presently received by the correction unit 31 is compared with the previous one result of the pressing operation of the hidden switch 2, and when the input value presently received is out of a setting interval of the input value, the input value presently received is set as the maximum correction value. In addition, several sampled values under a non-inputted state before the previous operation of the hidden switch 2 are averaged as the minimum correction value.

After the step S2 is performed, step S3 of determining whether there is an output value to be outputted by the defuzzification unit 34. When the judgment result of the step S3 is TRUE, step S4 of deciding a intermediate correction value by an average value of the maximum correction value and the minimum correction value, and determining whether a range of an interval between the maximum correction value and the intermediate correction value is enough to constitute the fuzzy interval of the membership function is performed. When the judgment result of the step S4 is TRUE, step S5 of allowing the correction unit to output the maximum correction value, the minimum correction value and the intermediate correction value is performed. At last, step S9 of adjusting the fuzzy inference system is performed, so that the range and the number of the fuzzy interval of the membership function are dynamically adjusted.

On the other hand, when the judgment result of the step S3 is FALSE, step S6 of allowing the fuzzification unit 31 to constitute the minimum correction value according to all the output value which are presently received. Step S7 of determining whether a range of an interval between the maximum correction value and the minimum correction value is enough to constitute the fuzzy interval of the membership function is then performed. When the judgment result of the step S7 is TRUE, the step S4 is performed. On the contrary, when the judgment result of the step S7 is FALSE, step S8 of notifying that functions of the fuzzy inference system are failed is performed. Furthermore, when the judgment result of the step S4 is FALSE, it represents that the input condition of the hidden switch 2 is deteriorated and the control correction can be no longer performed, so that the step S8 of notifying the user that the function of the fuzzy inference system 30 is invalid is performed when the judgment result of the step S4 is FALSE.

From the above description, the correction control method of the present invention can determine whether the output value is outputted by the defuzzification unit 34 and dynamically adjust the magnitude of the fuzzy intervals and the number of the fuzzy intervals of the membership function in the rule base 32 through the feedback of the output value when the output value is existed and the input conditions of the hidden switch 2 are changed. The functionality of the supervised algorithm used by the hidden switch 2 is enhanced. In addition, once the input conditions are deteriorated and the correction control is unable to be performed, the correction control method of the present invention may still warn the user.

In the step S7 of the embodiments mentioned above, when the interval between the maximum correction value and the minimum correction value is greater than a first constant of a product multiplied by a system initial maximum value, the range of the interval between the maximum correction value and the minimum correction value is determined as being enough to constitute the fuzzy interval of the membership function, and the step S4 is performed. On the contrary, when the interval between the maximum correction value and the minimum correction value is less than or equal to the first constant of the product multiplied by the system initial maximum value, the range of the interval between the maximum correction value and the minimum correction value is determined as being not enough to constitute the fuzzy interval of the membership function, and the step S8 is performed. The first constant is a percentage value.

In the step S4, when the interval between the maximum correction value and the intermediate correction value is greater than a second constant of a product multiplied by a system initial maximum value, the range of the interval between the maximum correction value and the intermediate correction value is determined as being enough to constitute the fuzzy interval of the membership function, and the step S5 is performed. On the contrary, when the interval between the maximum correction value and the intermediate correction value is less than or equal to the second constant of the product multiplied by the system initial maximum value, the range of the interval between the maximum correction value and the intermediate correction value is determined as being not enough to constitute the fuzzy interval of the membership function, and the step S8 is performed. The second constant is a percentage value.

Figure 3:
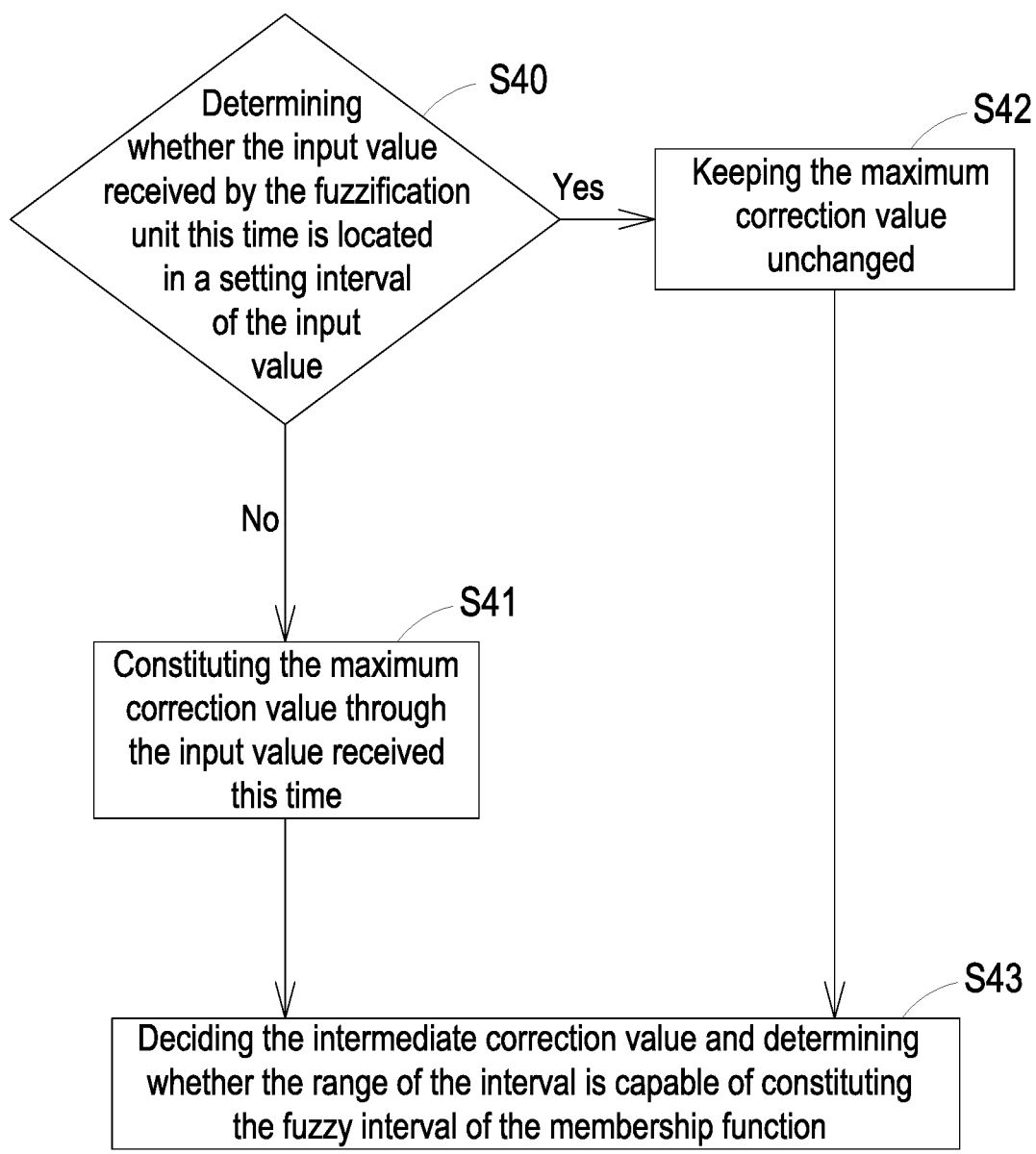
FIG. 3 schematically illustrates the flow chart of the sub-steps of the step S4 shown in FIG. 1.

Please refer to FIG. 3. FIG. 3 schematically illustrates the flow chart of the sub-steps of the step S4 shown in FIG. 1. In some embodiments, the step S4 further includes sub-steps S40, S41, S42 and S43. After the step S3 is performed and finished, the sub-step S40 of determining whether the input value received by the fuzzification unit this time is located in a setting interval of the input value is performed. The setting interval of the input value is in a range of 0.9 to 1.1 times of current the maximum correction value. However, the interval range of the input set interval is not limited as described above. It can be correspondingly set according to the type of the electronic device 1.

When the judgment result of the sub-step S40 is FALSE, sub-step S41 of constituting the maximum correction value through the input value received by the fuzzification unit 31 this time is performed. On the contrary, when the judgment result of the sub-step S40 is TRUE, sub-step S42 of keeping the maximum correction value unchanged is performed. After the sub-step S41 is performed and finished, sub-step S43 of deciding the intermediate correction value through the maximum correction value and the minimum correction value, and determining whether the range of the interval between the maximum correction value and the intermediate correction value is capable of constituting the fuzzy interval of the membership function is performed. After sub-step S42 is performed and finished, the sub-step S43 is performed.

Figure 4:
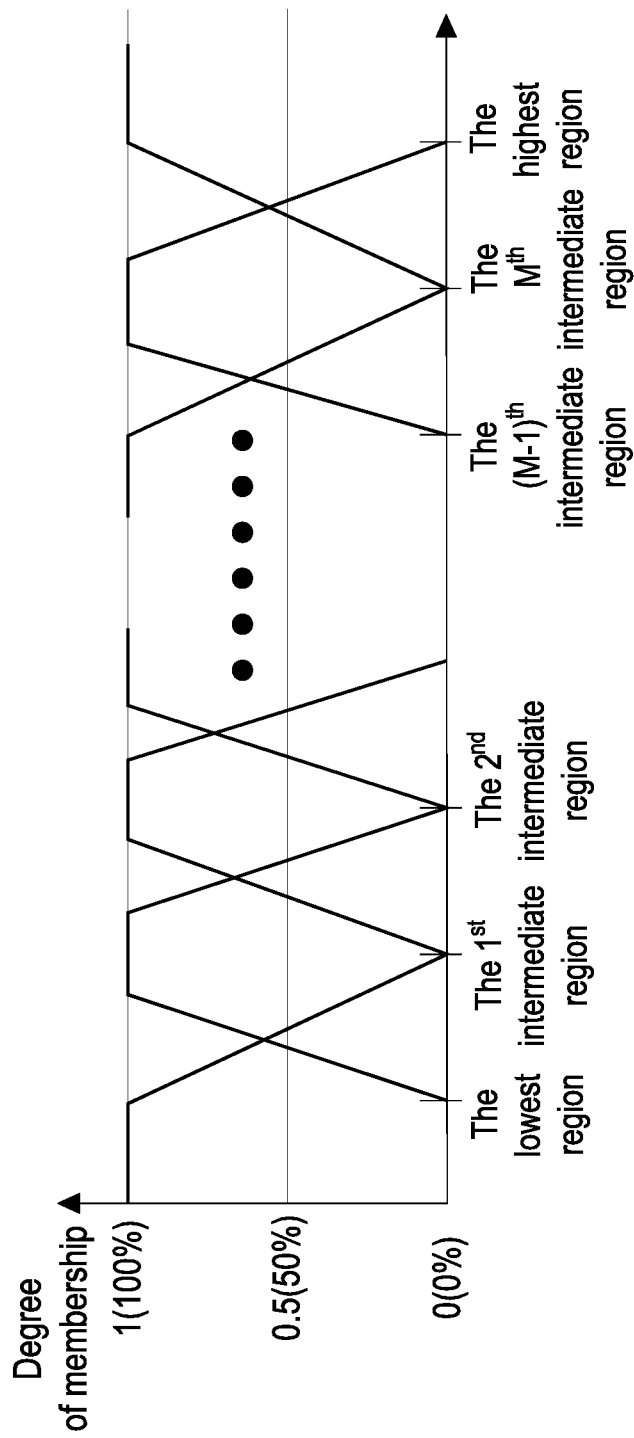
FIG. 4 schematically illustrates the intervals of the membership function in the rule base shown in FIG. 2.

Please refer to FIG. 4. FIG. 4 schematically illustrates the intervals of the membership function in the rule base shown in FIG. 2. The horizontal axis of the waveform graph of the membership function of the rule base 32 is an adjustable and variable range, which represents the fuzzy interval after the input value or the output value is fuzzed. In addition, the horizontal axis of the membership function includes the lowest region, at least one intermediate region, and at least three fuzzy intervals of the highest region. The number of the intermediate regions may be, for example, M, in which M is greater than or equal to 1. The vertical axis represents the degree of membership (i.e. the occupied proportion of the input value or the output value after fuzzification in the membership function, DOM), with 0 to 1 (i.e. 0-100%) as the fuzzy criterion.

Figure 5:
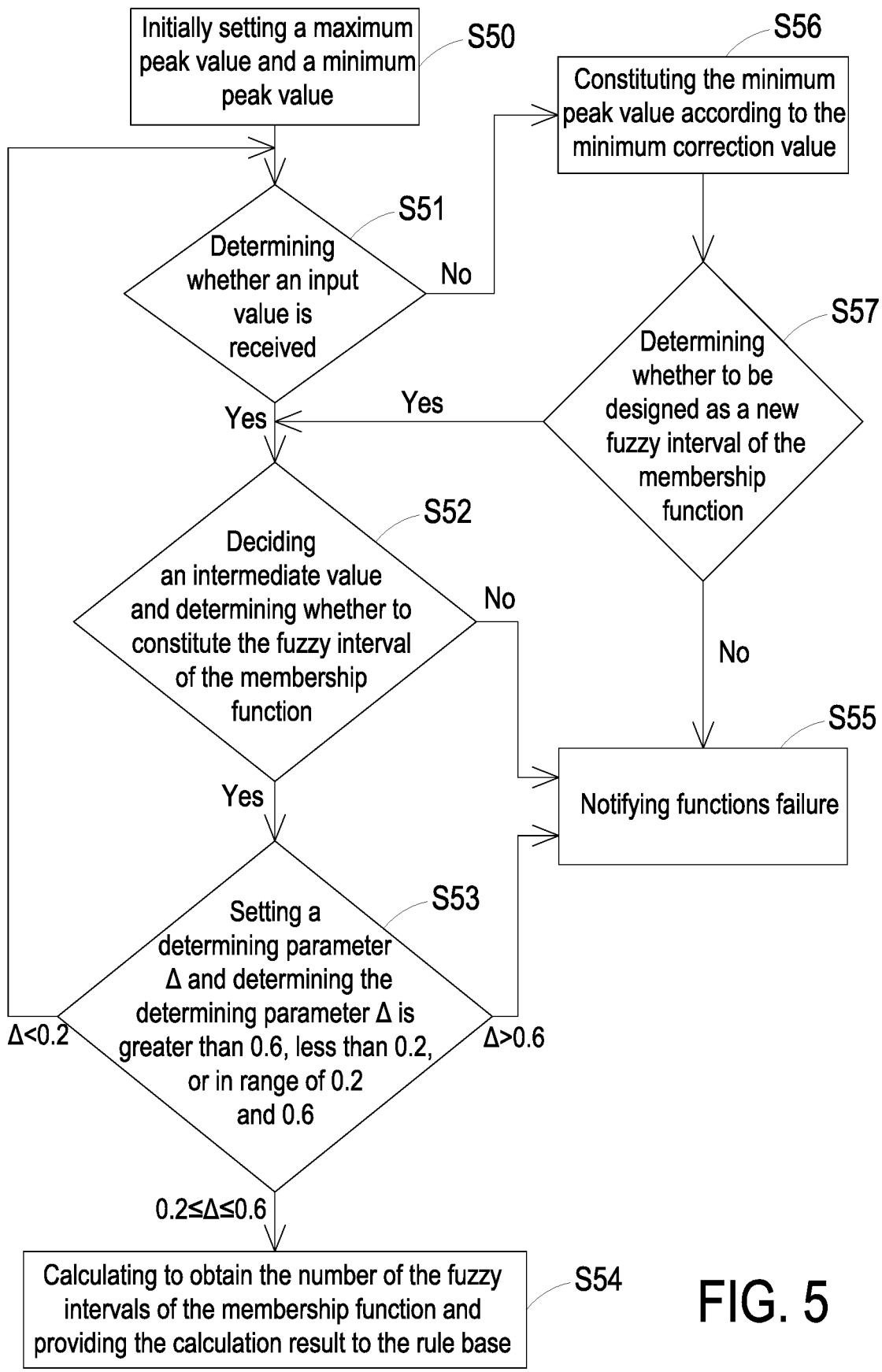
FIG. 5 schematically illustrates the flow chart of a peak value decision unit of a fuzzy inference system shown in FIG. 2 performing a decision method.

Please refer to FIG. 2 and FIG. 5. FIG. 5 schematically illustrates the flow chart of a peak value decision unit of a fuzzy inference system shown in FIG. 2 performing a decision method. In some embodiments, the fuzzy inference system 30 further includes a peak value decision unit 36 (as shown in FIG. 2). The peak value decision unit 36 is mainly utilized to receive the input value transmitted by the sensor 4, receive the maximum correction value, the minimum correction value and the intermediate correction value transmitted by the correction unit 35, calculate the number of the fuzzy intervals of the membership function by using the input value, the maximum correction value, the minimum correction value and the intermediate correction value, and provide the calculation result to the rule base 32, so that the rule base 32 may dynamically adjust the membership function.

In this embodiment, the peak value decision unit 36 may perform a decision method. The decision method will firstly perform step S50 of initially setting a maximum peak value and a minimum peak value. In the step S50, the maximum value of the input values reflected on the sensor 4 is set as the maximum peak value and the minimum value of the input values is simultaneously set as the minimum peak value when the hidden switch 2 is pressed under an ideal state (e.g. the time the hidden switch is just shipped from the factory).

After the step S50 is performed and finished, step S51 of determining whether an input value is received by the fuzzification unit 31 is performed. When the judgment result of the step S51 is TRUE, step S52 of deciding an intermediate value according to an average value of the maximum peak value and the minimum peak value and then determining whether the range of the interval between the maximum peak value and the intermediate value is enough to constitute the fuzzy interval of the membership function is performed. When the judgment result of the step S52 is TRUE, step S53 of setting a determining parameter $\Delta$ and determining the determining parameter $\Delta$ is greater than 0.6, less than 0.2, or in range of 0.2 and 0.6 (i.e. $0.2 \leq \Delta \leq 0.6$) is performed. The determining parameter $\Delta$ is written by:

$$\Delta = |(\text{intermediate value} - \text{intermediate correction value})|/\text{intermediate correction value}.$$

When the judgment result of the step S53 is that the determining parameter $\Delta$ is in range of 0.2 and 0.6, step S54 of calculating to obtain the number N of the fuzzy intervals of the membership function by using the input value, the maximum correction value, the minimum correction value and the intermediate correction value and providing the calculation result to the rule base 32 is performed, so that the rule base 32 may dynamically adjust the membership function. In the step S54, the formula of the number N of the fuzzy intervals is written by:

$$N = 1 + (|(\text{maximum peak value} - \text{minimum peak value})|/(\text{the third constant} \times \text{determining parameter } \Delta)),$$
in which the third constant is a percentage value.

When the judgment result of the step S53 is that the determining parameter $\Delta$ is greater than 0.6, it represents that the difference between the intermediate value and the intermediate correction value is too large to calculate the number of the fuzzy intervals of the membership function, so that step S55 of notifying the failure of the function of the fuzzy inference system 30 is performed. In addition, when the judgment result of the step S53 is that the determining parameter $\Delta$ is less than 0.2, the step S51 is re-performed.

Moreover, when the judgment result of the step S51 is FALSE, step S56 of constituting the minimum peak value according to the minimum correction value is performed. Step S57 of determining whether the range of the interval between the maximum peak value and the minimum peak value is enough to be designed as a new fuzzy interval of the membership function is performed. When the judgment result of the step S57 is TURE, the step S52 is performed. On the contrary, when the judgment result of the step S57 is FALSE, the step S55 is performed. Additionally, when the judgment result of the step S52 is FALSE, it represents that the input conditions of the hidden switch 2 are too bad to perform the correction of control, so that the step S55 is performed.

In the step S57 of the embodiments mentioned above, when the interval between the maximum peak value and the minimum peak value is greater than a first constant of a product multiplied by a system initial maximum value, the range of the interval between the maximum peak value and the minimum peak value is determined as being enough to be designed as a new fuzzy interval of the membership function, and the step S52 is performed. On the contrary, when the interval between the maximum peak value and the minimum peak value is less than or equal to the first constant of the product multiplied by the system initial maximum value, the range of the interval between the maximum peak value and the minimum peak value is determined as being not enough to be designed as a new fuzzy interval of the membership function, and the step S55 is performed.

Figure 6:
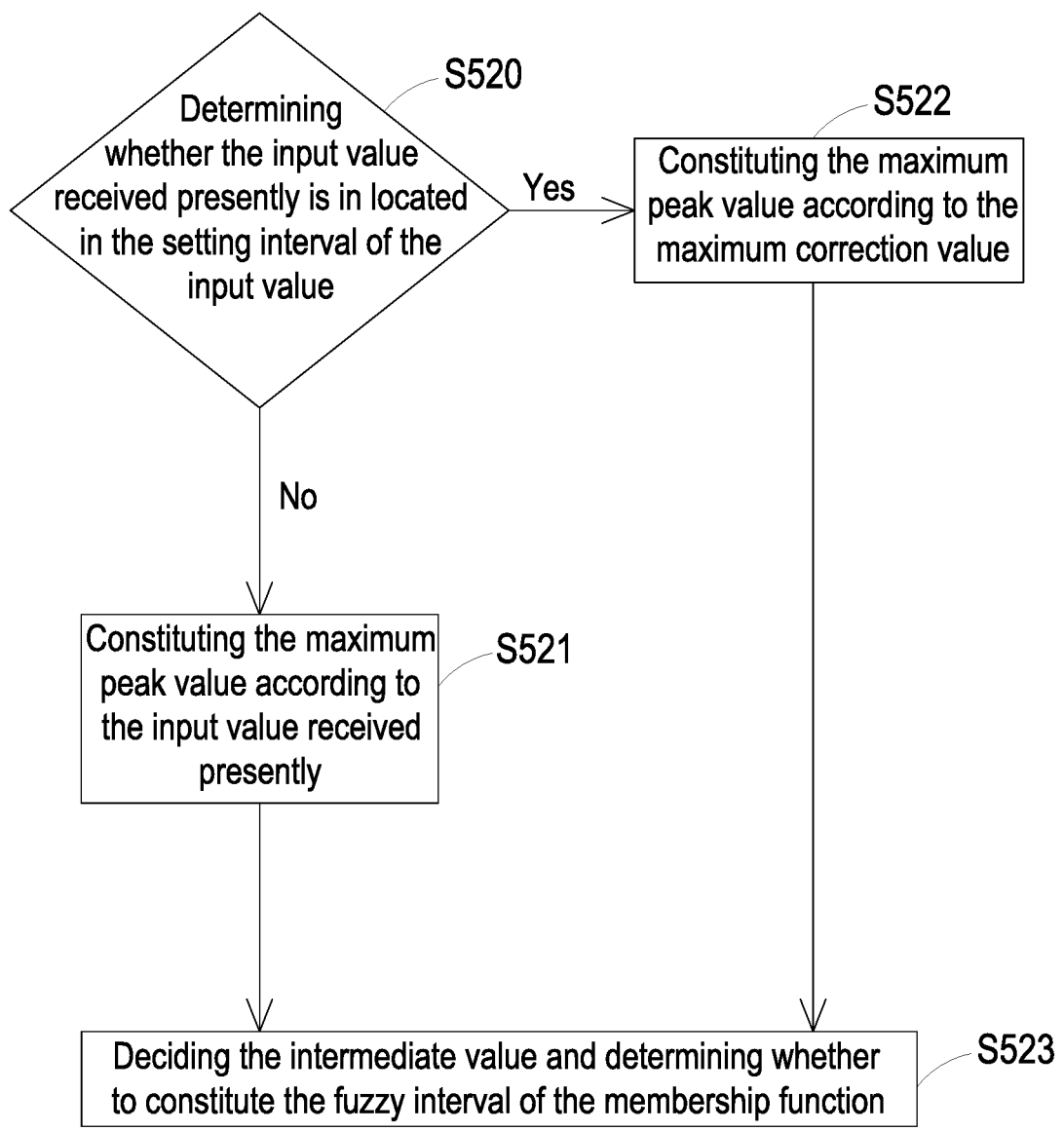
FIG. 6 schematically illustrates the flow chart of the sub-steps of the step S5 shown in FIG. 5.

Please refer to FIG. 6. FIG. 6 schematically illustrates the flow chart of the sub-steps of the step S5 shown in FIG. 5. In some embodiments, the step S52 further includes sub-steps S520-S523. After the step S51 is performed and finished, sub-step S520 of determining whether the input value received presently is in located in the setting interval of the input value is performed. When the judgment result of the step S520 is FALSE, sub-step S521 of constituting the maximum peak value according to the input value received presently is performed. On the contrary, when the judgment result of the step S520 is TRUE, sub-step S522 of constituting the maximum peak value according to the maximum correction value is performed. After the sub-step S521 is performed and finished, sub-step S523 of deciding the intermediate value according to the maximum peak value and the minimum peak value and determining whether the range of the interval between the maximum peak value and the intermediate value is enough to constitute the fuzzy interval of the membership function is performed. After the sub-step S522 is performed and finished, the sub-step S523 is performed.

By utilizing the peak value decision unit 36, the maximum values and minimum values of the input values may be continuously recorded during the operations of the hidden switch 2, and further the number of the fuzzy intervals of the membership function may be calculated, thereby providing the references to the rule base 32 for defining the fuzzy set.

Figure 7:
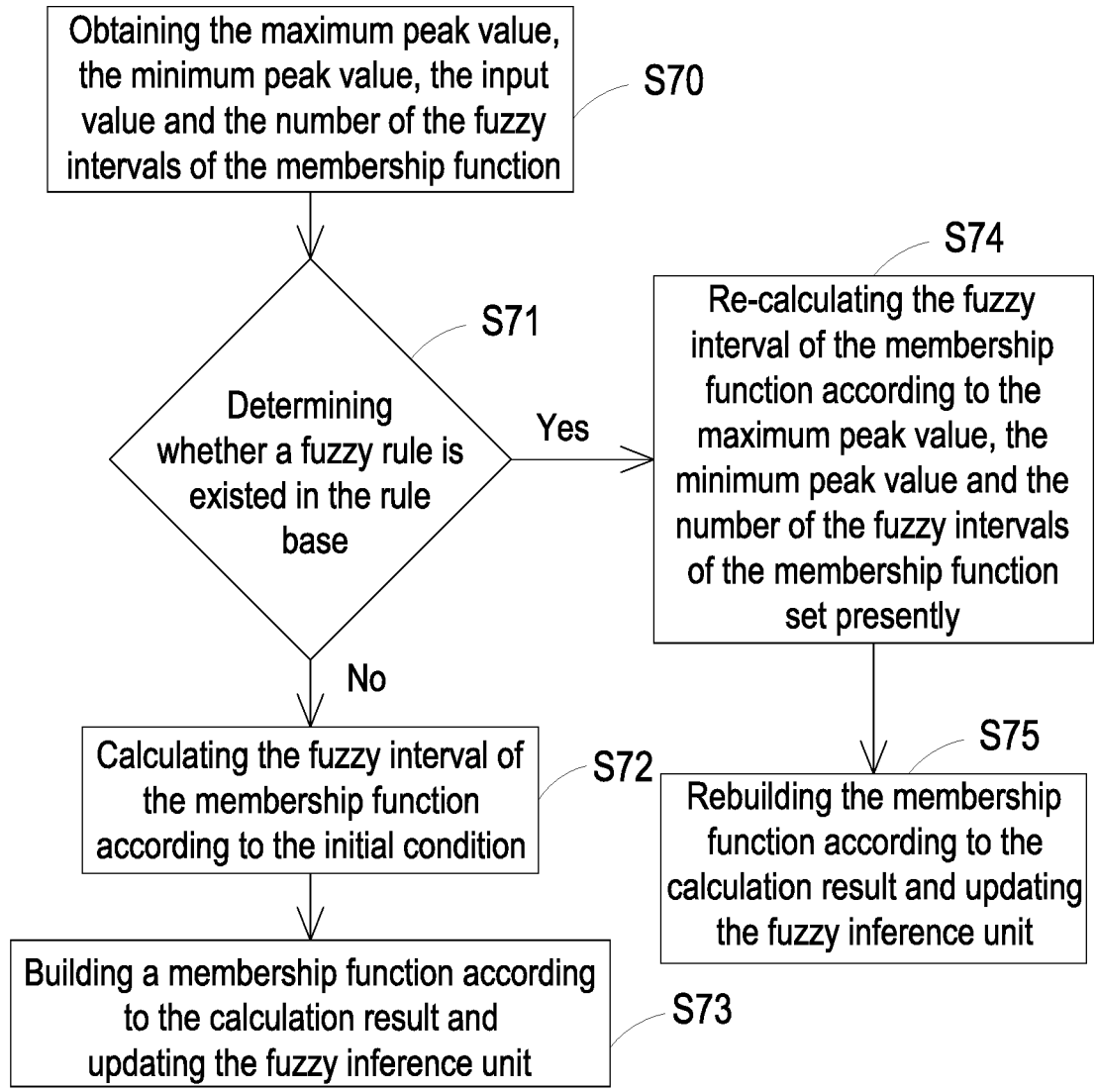
FIG. 7 schematically illustrates the flow chart of a rule base of a fuzzy inference system shown in FIG. 2 performing an update method.

Please refer to FIG. 2 and FIG. 7. FIG. 7 schematically illustrates the flow chart of a rule base of a fuzzy inference system shown in FIG. 2 performing an update method. An update method may be performed by the rule base 32 of the present embodiment. The update method firstly performs step S70 of obtaining the maximum peak value, the minimum peak value, the input value and the number N of the fuzzy intervals of the membership function from the peak value decision unit 36. Next, step S71 of determining whether a fuzzy rule is existed in the rule base 32 is performed. When the judgment result of the step S71 is FALSE, step S72 of calculating the fuzzy interval of the membership function according to the initial condition is performed. In the step S72, the initial condition includes the maximum peak value and the minimum peak value set according to the maximum value and the minimum value of the initial input values reflected on the controller 3 when the hidden switch 2 is pressed under an ideal state (e.g. the time the hidden switch is just shipped from the factory), and the initial number of the fuzzy intervals of the membership function obtained according to both the minimum peak value and the maximum peak value. Step S73 of building a membership function according to the calculation result and updating the fuzzy inference unit 33 is then performed.

In addition, when the judgment result of the step S71 is TRUE, step S74 of re-calculating the fuzzy interval of the membership function according to the maximum peak value, the minimum peak value and the number of the fuzzy intervals of the membership function set presently is performed. Next, step S75 of rebuilding the membership function according to the calculation result and updating the fuzzy inference unit 33 is performed.

In this embodiment, since the maximum peak value and the minimum peak value are continuously updated in the rule base 32, the membership function can be varied in response to the changes of the input conditions of the hidden switch 2, so that the membership function presently required by the hidden switch 2 can be defined more appropriately.

From the above description, the present invention provides a correction control method of a hidden switch. The correction control method of the present invention can determine whether the output value is outputted by the defuzzification unit and dynamically adjust the magnitude of the fuzzy intervals and the number of the fuzzy intervals of the membership function in the rule base when the output value is existed and the input conditions of the hidden switch are changed. The new fuzzy rules are continuously and automatically generated, so that the electronic product may utilized the new fuzzy rules as the determining conditions of the operations of the hidden switch. The functionality of the supervised algorithm used by the hidden switch is enhanced. Moreover, once the input conditions of the hidden switch are deteriorated and the correction control is unable to be performed, the correction control method of the present invention warns the user.

What is claimed is:

1. A correction control method, applied to an electronic device comprising a hidden switch, an electronic controller and a sensor, wherein the sensor is configured to sense a pressing operation of the hidden switch, and the electronic controller is connected to the sensor, receives an input value transmitted from the sensor and utilizes a membership function of a fuzzy control to perform a correction control on each pressing operation of the hidden switch, the correction control method comprising:

(a) rebuilding a fuzzy inference system on each pressing operation of the hidden switch by the electronic controller, wherein the fuzzy inference system comprises a fuzzification unit, a rule base, a fuzzy inference unit, a defuzzification unit and a correction unit, the rule base defines a plurality of fuzzy rules and form and range of the membership function, the fuzzification unit is connected to the sensor and correspondingly receives the input value when the pressing operation is performed through the hidden switch and converts the input value into a fuzzy input set corresponding to the membership function, the fuzzy inference unit is connected to the fuzzification unit and receives the fuzzy input set to execute inferences of the fuzzy rules so as to output a fuzzy output set, and the defuzzification unit is connected to the fuzzy inference unit and performs a defuzzification on the fuzzy output set to determine a fuzzy interval where a dynamic range is adjusted when the hidden switch is pressed and correspondingly generates an output value, and the correction unit is connected to an output of the defuzzification unit;

(b) setting a maximum correction value and a minimum correction value on the correction unit by the electronic controller;

(c) determining whether the output value is outputted from the defuzzification unit;

(d) when determining that the result of the step (c) is satisfied, the correction unit determines an intermediate correction value based on an average value of the maximum correction value and the minimum correction value, and the correction unit determines whether a range of an interval between the maximum correction value and the intermediate correction value is enough to constitute the fuzzy interval of the membership function;

(e) when the determining result of the step (d) is satisfied, the correction unit outputs the maximum correction value, the minimum correction value and the intermediate correction value;

(f) adjusting the fuzzy inference system by the electronic controller, so that the range and the number of the fuzzy interval of the membership function are dynamically adjusted according to the maximum correction value, the minimum correction value and the intermediate correction value;

(g) when the determining result of the step (c) is not satisfied, the electronic controller constitutes the minimum correction value according to an average value of all the input values which are transmitted from the sensor and presently received by the fuzzification unit;

(h) after the step (g) is performed, the electronic controller determines whether a range of an interval between the maximum correction value and the minimum correction value is enough to constitute the fuzzy interval of the membership function; and (i) when the determining result of the step (h) is satisfied, the step (d) is repeatedly done, when the determining result of the step (h) is not satisfied, the electronic controller notifies that functions of the fuzzy inference system are failed.

2. The correction control method according to claim 1, wherein an input value received by the correction unit is the output value outputted by the defuzzification unit, and wherein in the step (b), the input value presently received by the correction unit is compared with the previous result of the pressing operation of the hidden switch, and when the input value presently received is out of a setting interval of the input value, the output value presently being in progress of defuzzification of the defuzzification unit is set as the maximum correction value.

3. The correction control method according to claim 2, wherein the setting interval of the input value is in a range of 0.9 to 1.1 times of the current maximum correction value.

4. The correction control method according to claim 1, wherein in the step (b), several values sampled by the fuzzification unit before the previous operation of the hidden switch, are averaged as the minimum correction value, wherein the several values are generated by the hidden switch when the hidden switch is non-inputted.

5. The correction control method according to claim 1, wherein the step (d) further comprises:

(d1) the correction unit determining whether the current input value received by the fuzzification unit is located in a setting interval of the input value;

(d2) when determining result of the step (d1) is not satisfied, the electronic controller constitutes the maximum correction value based on the input value received by the fuzzification unit this time;

(d3) when determining result of the step (d1) is satisfied, the electronic controller keeps the maximum correction value unchanged; and (d4) after the step (d2) or the step (d3) is performed, the correction unit determines the intermediate correction value based on the maximum correction value and the minimum correction value, and determining whether the range of the interval between the maximum correction value and the intermediate correction value is capable of constituting the fuzzy interval of the membership function.

6. The correction control method according to claim 1, wherein the input value received by the fuzzification unit and the magnitude of received pressure or deformation have a corresponding relationship during the pressing operation of the hidden switch.

7. The correction control method according to claim 1, wherein in the step (g), when the interval between the maximum correction value and the minimum correction value is greater than a first constant of a product multiplied by a system initial maximum value, the range of the interval between the maximum correction value and the minimum correction value is determined as being enough to constitute the fuzzy interval of the membership function, and when the interval between the maximum correction value and the minimum correction value is less than or equal to the first constant of the product multiplied by the system initial maximum value, the range of the interval between the maximum correction value and the minimum correction value is determined as being not enough to constitute the fuzzy interval of the membership function.

8. The correction control method according to claim 7, wherein the first constant is a percentage value.

9. The correction control method according to claim 1, wherein in the step (d), when the interval between the maximum correction value and the intermediate correction value is greater than a second constant of a product multiplied by a system initial maximum value, the range of the interval between the maximum correction value and the intermediate correction value is determined as being enough to constitute the fuzzy interval of the membership function, and when the interval between the maximum correction value and the intermediate correction value is less than or equal to the second constant of the product multiplied by the system initial maximum value, the range of the interval between the maximum correction value and the intermediate correction value is determined as being not enough to constitute the fuzzy interval of the membership function.

10. The correction control method according to claim 9, wherein the second constant is a percentage value.

* * * * *